United States Patent [19]

Tsubaki et al.

[11] 4,311,225

[45] Jan. 19, 1982

[54] DEVICE FOR DRIVING DRIVEN MEMBER BY ROLLER CHAIN

[75] Inventors: Toshio Tsubaki; Takeshi Tokunaga; Seiji Yonekura; Shigeru Matsuoka; Makoto Miura; Kozi Yamauchi, all of Hitachi, Japan

[73] Assignee: Hitachi, Ltd., Tokyo, Japan

[21] Appl. No.: 47,798

[22] Filed: Jun. 12, 1979

[30] Foreign Application Priority Data

| | | | |
|---|---|---|---|
| Jun. 14, 1978 | [JP] | Japan | 53-72502 |
| Jun. 14, 1978 | [JP] | Japan | 53-72503 |
| Jun. 14, 1978 | [JP] | Japan | 53-72504 |
| Jun. 14, 1978 | [JP] | Japan | 53-72506 |
| Jun. 14, 1978 | [JP] | Japan | 53-72507 |
| Jun. 14, 1978 | [JP] | Japan | 53-72508 |
| Jun. 14, 1978 | [JP] | Japan | 53-72509 |

[51] Int. Cl.³ ........................ F16D 7/02; F16D 71/00; E05F 15/14

[52] U.S. Cl. .................................... 192/142 R; 49/26; 49/139; 49/199; 74/89.21; 116/86; 192/150; 474/115

[58] Field of Search ..................... 49/26, 28, 199, 139, 49/325; 74/89.21, 242.9, 240; 192/142 R, 143, 150; 318/267; 340/548, 565, 668; 116/86; 474/115

[56] References Cited

U.S. PATENT DOCUMENTS

| | | | |
|---|---|---|---|
| 2,560,236 | 7/1951 | McNinch et al. | 49/199 X |
| 2,832,590 | 4/1958 | Youngberg | 49/325 |
| 3,193,274 | 7/1965 | Miller | 49/199 X |
| 3,625,077 | 12/1971 | Bernard et al. | 74/89.21 |
| 3,625,328 | 12/1971 | Carli | 192/142 R |
| 3,630,094 | 12/1971 | Carli | 49/139 X |
| 3,736,483 | 5/1973 | Conlee | 318/469 |
| 3,858,452 | 1/1975 | Gatland et al. | 49/139 X |
| 3,993,988 | 11/1976 | Walter | 340/548 |
| 3,996,697 | 12/1976 | Bailey et al. | 49/139 X |
| 4,107,877 | 8/1978 | Lee | 49/28 |
| 4,159,598 | 7/1979 | Gatland et al. | 49/28 |

FOREIGN PATENT DOCUMENTS

| | | | |
|---|---|---|---|
| 954821 | 1/1950 | France | 74/242.9 |
| 739718 | 11/1955 | United Kingdom | 49/139 |

*Primary Examiner*—Rodney H. Bonck
*Attorney, Agent, or Firm*—Craig and Antonelli

[57] ABSTRACT

A door member such as a garage door is driven by a motor through a roller chain having a finite length to travel in the garage opening and closing directions. The roller chain is driven by a single drive sprocket driven by the motor to make its reciprocating movement along the same path while making rolling engagement at its roller portion with a guide rail constructed to support the roller portion of the roller chain from the opposite sides. A trolley connected to the door member by an arm is releasably coupled to the roller chain and is also guided along the guide rail while making sliding engagement therewith. A mechanism for detecting abutment of the door member with an obstruction present on the traveling path is provided to detect the above situation when a physical force is imparted to the roller chain due to the abutment. The opening and closing movement of the door member, stopping of rotation of the motor and detection of the presence of an obstruction are electrically controlled.

18 Claims, 18 Drawing Figures

MOTOR CONTROL
50
99
18
183
184
64
18a
97c
93
91
92
97a
98
97d
94
95
96
97b
90
88b
88a
14
16
12
38

97a
97b
P

MOTOR CONTROL
301
302
303
304
305
306
307
308
309
310
311
312
313
314
315
316
317
318
319a
319b
XC

DEVICE FOR DRIVING DRIVEN MEMBER BY ROLLER CHAIN

This invention relates generally to a device for driving a driven member by a roller chain, and more particularly, but not exclusively, to a device suitable for operating a door member or the like.

Devices such as garage door openers for operating door members or the like have become increasingly popular by virtue of the convenience and safety with which they can be operated to open and close the door members or the like.

Among various types of known garage door openers, there is a type which employs an endless chain.

A publication, for example, U.S. Pat. No. 3,625,328 discloses a garage door opener which comprises a motor, a rail fixed at one end thereof to a frame mounting the motor thereon and at the other end thereof to a ceiling support or a wall by a fixing member, an idle sprocket pivotally secured to one end of the rail, a drive sprocket connected to the motor, an endless chain trained in the form of a loop around the idle and drive sprockets, and a trolley coupled to the endless chain directly and also to a door member by an arm to make sliding movement while being guided along the rail with the movement of the chain thereby moving the door member in either direction.

There is also another type which employs a long screw shaft.

A publication, for example, U.S. Pat. No. 3,736,483 discloses a garage door opener which comprises a motor, a worm gear directly attached to the output shaft of this motor, a traveler coupled to the worm gear, and a door member driven in either direction with the movement of the traveler.

However, either of the endless chain type and the long screw shaft type disclosed in these prior art publications includes several problems as pointed out presently.

(1) Difficulty of handling

In the endless chain type, it is difficult to train the endless chain around the idle sprocket and drive sprocket without any slack.

Also, in the long screw shaft type, it is difficult to carry or transport the long screw shaft to the site because of its length.

(2) Tendency of noisy operation

In the endless chain type, the difficulty of training the endless chain around the idle and drive sprockets without any slack results in striking of the chain against the rail during the operation, and this provides a source of noise.

Also, in the long screw shaft type, the rotation of the screw in the rail at the high speed gives rise to occurrence of noise when the grease is lost from the relatively rotating areas.

(3) Lack of flexibility

Each of the endless chain type and the long screw shaft type is inconvenient in that the endless chain or the screw shaft must be replaced by another when it is desired to change the traveling distance of the door member, that is, the movable distance of the trolley.

(4) Troublesome maintenance

In the endless chain type, the chain is frequently run in a naked condition, and dust and other foreign matters tend to accumulate on the chain, resulting in a degraded mobility unless maintenance is frequently made.

Also, in the long screw shaft type, frequent application of grease to the shaft is required to ensure smooth rotation.

(5) Inadequacy for application to door movement along curved path

In the endless chain type, many sprockets must be disposed along a curved path in order to guide the door member along such a path, resulting in high costs.

The long screw shaft type is not primarily designed to guide the door member along a curved path and is unfit for such an application.

With a view to obviate the prior art difficulties pointed out above, it is an object of the present invention to provide a novel and improved device for driving a driven member by a roller chain which may be easily handled.

Another object of the present invention is to provide a device for driving a driven member by a roller chain which does not generate any appreciable noise during operation.

Still another object of the present invention is to provide a device for driving a driven member by a roller chain which is fully flexible in length adjustment.

Yet another object of the present invention is to provide a device for driving a driven member by a roller chain which may be easily maintained to ensure trouble-free operation.

A further object of the present invention is to provide a device for driving a driven member by a roller chain which is suitable for guiding the driven member along a curved path.

The device according to the present invention is featured by the fact that it comprises a roller chain which is not endless, guide means for guiding this roller chain therealong with the roller portion making rolling engagement therewith, a driven member connected to the roller chain, drive means for driving the roller chain so that the roller chain may be guided along the guide means, with its roller portion making rolling engagement therewith, and control means for controlling the operation of the drive means.

The device according to the present invention which employs a roller chain having a free end is therefore advantageous in that the drive chain may be easily handled, and the flexibility may be improved. In other words, the roller chain may be easily carried to the site and need not be supported at a plurality of support points unlike the endless chain. The roller chain may also be easily mounted in position without the necessity for tension adjustment or elimination of the slack. A demand for a change in the length of the roller chain may be easily dealt with by previously preparing a roller chain of sufficient or excess length, since the roller chain has a free end.

The device according to the present invention is also advantageous in that any appreciable noise is not generated during operation and the maintenance is facilitated due to the fact that the roller chain is guided along a guide rail while making rolling engagement at its roller portion with the guide rail. Thus, the grease or like lubricating oil need not be replenished, and the protection against accumulating dust and like foreign matters is also facilitated.

The device according to the present invention is further advantageous in that the roller chain may run along a curved path due to the fact that the roller chain is guided by the guide rail. This is easily realized by shaping the guide rail to conform to the shape of the desired curved path.

Other objects, features and advantages of the present invention will become more apparent from the following detailed description of preferred embodiments thereof taken in conjunction with the accompanying drawings, in which.

Figure 1:
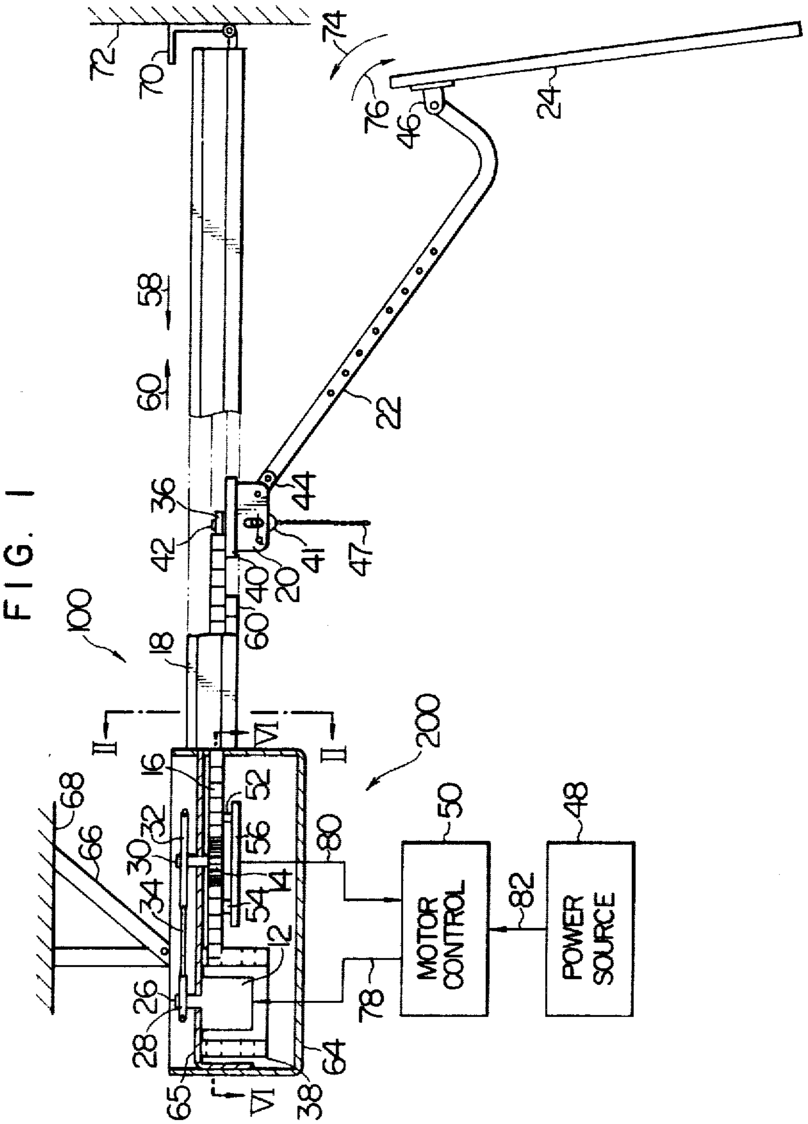
FIG. 1 is a schematic elevational view of a preferred embodiment of the device for driving a driven member by a roller chain according to the present invention, in which the device is used for operating a door member of a garage by way of example.

A preferred embodiment of the device for driving a driven member by a roller chain according to the present invention will be described with reference to FIG. 1. FIG. 1 shows schematically the structure of a garage door opener 100 as an application of the present invention.

Referring to FIG. 1, the garage door opener 100 comprises a motor 12, a drive sprocket 14 driven by the motor 12, a roller chain 16 having a free end and driven by the drive sprocket 14 for reciprocating movement, a guide rail 18 defining a guide path along which the roller chain 16 is guided while making rolling engagement at its roller portion therewith, a trolley 20 releasably coupled to the roller chain 16, and a door member 24 connected to the trolley 20 by an arm 22.

The motor 12 is operatively connected to drive sprocket 14 through a small-diameter pulley 28 secured to the output shaft 26 of the motor 12, a large-diameter pulley 32 secured similarly to the shaft 30 of the drive sprocket 14, and a belt 34 trained around the small-diameter and large-diameter pulleys 28 and 32.

Figure 3A:
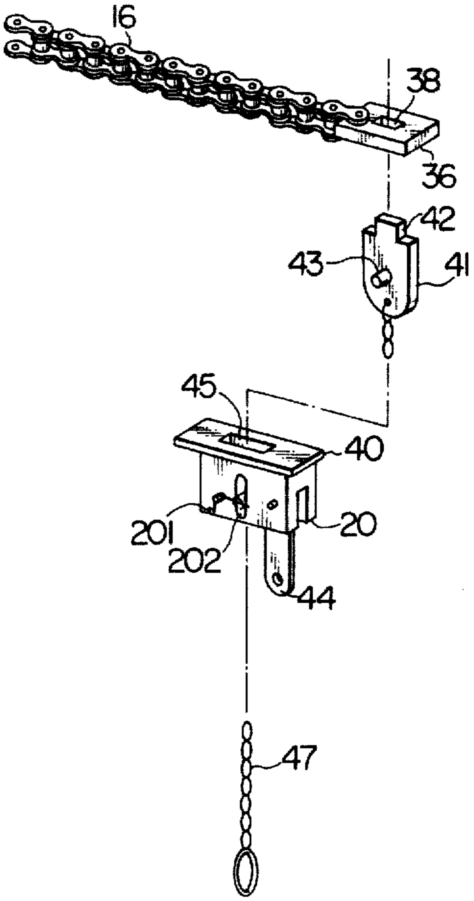
FIG. 3A is an exploded perspective view to show the releasable coupling between the roller chain and the trolley.
Figure 2:
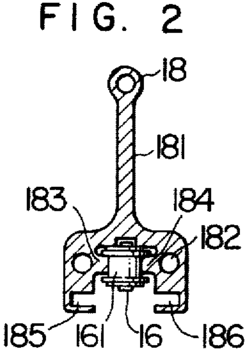
FIG. 2 is a sectional view taken along the line II—II in FIG. 1 to show the relative engagement between the roller chain and the guide rail.
Figure 4A:
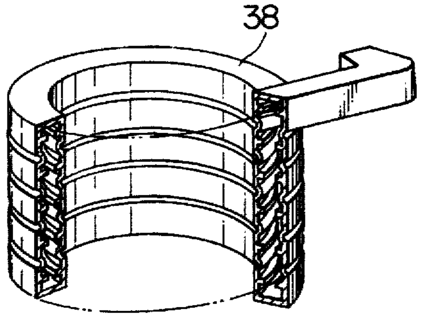
FIG. 4A is a partly cut-away perspective view of the roller chain casing for receiving a portion of the roller chain therein.

The roller chain 16 has a free end as shown in FIG. 3A, and a connecting plate 36 is provided on this free end of the roller chain 16. The other end portion of the roller chain 16 is guided into and accommodated in a spiral form within a roller chain casing 38 as shown in FIG. 4A. This roller chain casing 38 is disposed around the motor 12 as shown in FIG. 1. The roller chain 16 is guided along the internal space of the guide rail 18 while making rolling engagement at its roller portion therewith. As shown in FIG. 2, the roller chain 16 is supported by the opposite side walls of the internal space of the guide rail 18. However, the roller chain 16 may be supported only by one of the side walls.

The connecting plate 36 mounted on the free end of the roller chain 16 has a square slot 38 as shown in FIG. 3A to be engaged by a corresponding lug 42 formed on an intermediate coupling member 41 received in a slot 45 formed in a slide plate 40 of the trolley 20. Thus, the trolley 20 is releasably coupled to the roller chain 16 by the intermediate coupling member 41.

Referring to FIG. 1, the trolley 20 is pivotally connected to one end of the arm 22 by a pivot connection 44. The other end of the arm 22 is pivotally connected to a door bracket 46 fixed to the door member 24.

Figure 7:
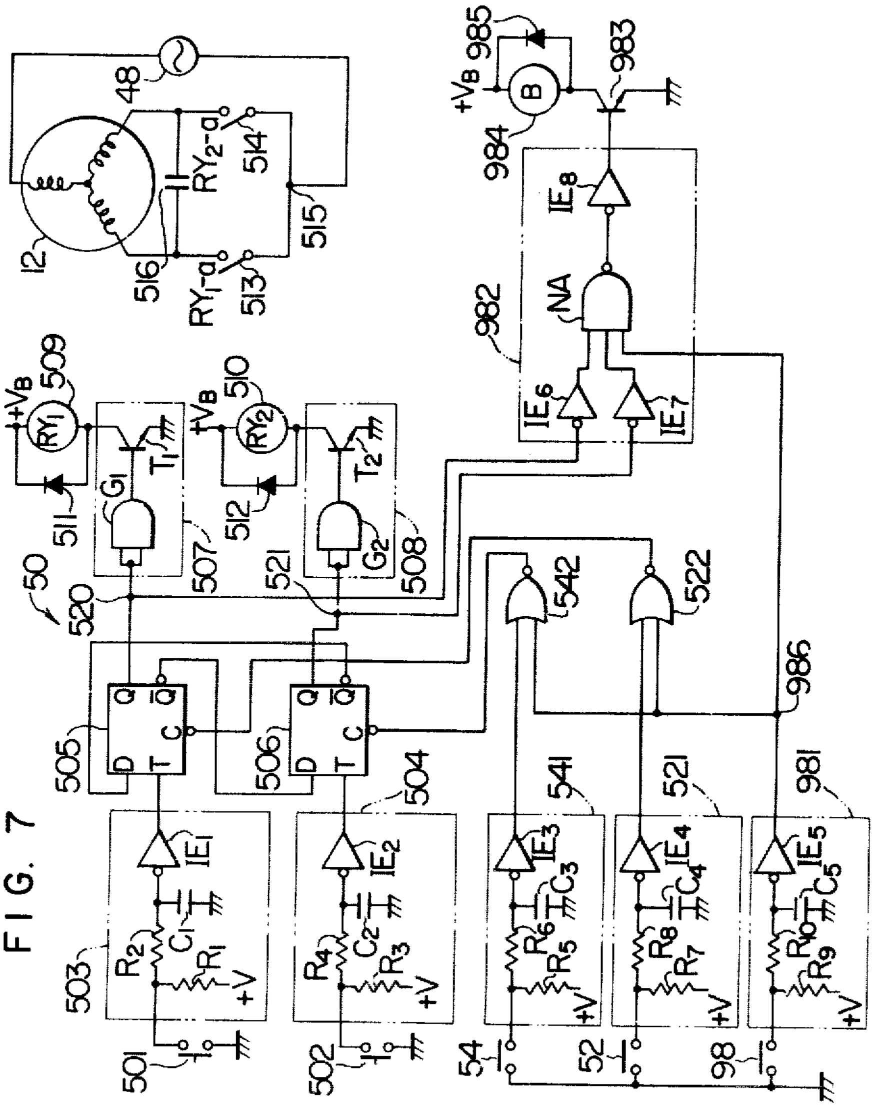
FIG. 7 is a circuit diagram of an electrical control circuit for the garage door opener shown in FIG. 1.

The garage opening and closing movement of the door member 24 is controlled by a motor control 50 the structure of which is shown in detail in FIG. 7. The motor control 50 is supplied with power from a power source 48 by way of a power supply line 82. A limit switch controlled 56 including a pair of limit switches 52 and 54 controls the upper and lower limits of the position of the door member 24, as will be described in detail later with reference to FIGS. 5A and 5B.

Figure 5A:
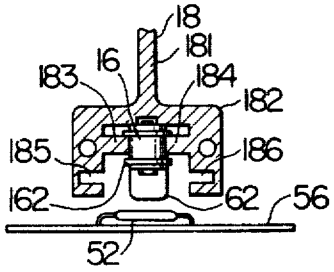
FIG. 5A is a partly sectional elevational view to show schematically a mechanism for determining the upper and lower limits of the position of the door member.
Figure 5B:
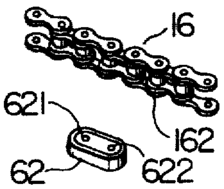
FIG. 5B is a perspective view to show the relation between the roller chain and one of the limit position determining members shown in FIG. 5A.

When the roller chain 16 moves in a direction as shown by the arrow 58 in FIG. 1, the door member 24 moves in a direction as shown by the arrow 74 until the door member 24 reaches its predetermined upper limit position. An upper limit position determining member 62 of a magnetic material as shown in FIGS. 5A and 5B is attached by the magnetic force to a predetermined position on the roller chain 16 so that the limit switch 52 may be turned on upon arrival of the door member 24 at its predetermined upper limit position. When, on the other hand, the roller chain 16 moves in a direction as shown by the arrow 60 in FIG. 1, the door member 24 moves in a direction as shown by the arrow 76 until the door member 24 reaches its predetermined lower limit position. A lower limit position determining member (not shown) similar to the member 62 is also attached by the magnetic force to another predetermined position on the roller chain 16 so that the limit switch 54 may be turned on upon arrival of the door member 24 at its predetermined lower limit position.

A housing 64 houses therein a drive and control assembly 200 including the motor 12, small-diameter pulley 28, belt 34, large-diameter pulley 32, drive sprocket 14, limit switches 52, 54, limit switch control 56 and motor control 50. This housing 64 is supported by a supporting member 66 fixed to a garage ceiling 68.

The guide rail 18 extends at one end thereof into the housing 64 to terminate therein and is fixedly secured at the other end thereof to a garage wall 72 by a mounting member 70.

In response to the application of an open instruction signal to the motor control 50 (FIG. 7) from an external signal source to cause opening movement of the door member 24, this signal is transmitted to the motor 12 by way of a signal path 78 thereby driving the motor 12.

The drive force of the motor 12 is transmitted from the small-diameter pulley 28 to the large-diameter pulley 32 through the belt 34 to drive the drive sprocket 14.

The drive sprocket 14 drives the roller chain 16 to move it in the direction of the arrow 58, and the trolley 20 coupled to the roller chain 16 is also moved in the same direction. Therefore, the door member 24 pivotally connected to the trolley 20 by the arm 22 is moved in the direction of the arrow 74 to be brought to its garage opening position from its garage closing position.

During this opening movement of the door member 24, the roller portion of the roller chain 16 is guided along a pair of opposite guide portions 183 and 184 of the guide rail 18 shown in FIG. 2 while making rolling engagement therewith.

Therefore, the individual parts of the roller chain 16 pass smoothly through the internal space of the guide rail 18 without flexing relative to one another as if they were an integral rigid body (a pseudo-rigid body). Thus, the frequency of generation of noise is reduced to a minimum, and the noise volume is quite low even if noise might be generated.

Upon arrival of the door member 24 at its predetermined upper limit position, the upper limit position determining member 62 attached by the magnetic force to the predetermined position on the roller chain 16 for turning on the limit switch 52 acts to turn on the limit switch 52.

When the limit switch 52 is thus turned on, its output signal is applied from the limit switch control 56 to the motor control 50 by way of a signal path 80 to stop the rotation of the motor 12 in FIG. 7, and the travelling movement of the door member 24 is stopped upon its arrival at the predetermined upper limit position.

The door member 24 may be brought to its garage closing position by reversing the direction of rotation of the motor 12.

In the manner above described, the roller chain 16 is driven to make reciprocating movement through the internal space of the guide rail 18 along the guide portions 183 and 184 of the guide rail 18. With the reciprocating movement of the roller chain 16 along the guide rail 18, the trolley 20 coupled to the roller chain 16 by the connecting plate 36 and intermediate coupling member 41 makes also reciprocating movement along the guide rail 18. This reciprocating movement of the trolley 20 along the guide rail 18 causes the garage opening and closing movement of the door member 24 pivotally connected to the trolley 20 by the arm 22.

According to this embodiment of the present invention, the roller chain 16 having the free end is guided by the guide portions 183 and 184 formed in the guide rail 18 while making rolling engagement at its roller portion therewith. Therefore, the tendency of generation of noise is minimized, and the number of times of replenishment of lubricating oil is also reduced.

The roller chain 16 may be easily carried or transported to the site due to the fact that the roller chain 16 is free at one end thereof and is guided at the other end portion thereof into the roller chain casing 38 to be accommodated therein in the form of the a spiral. Further, the arrangement is such that the roller chain 16 is arranged to move along the guide path defined between the guide portions 183 and 184 of the guide rail 18. This arrangement eliminates troublesome mounting procedures including adjustment of the tension on the roller chain 16.

It is quite easy to previously store a sufficient length of the roller chain portion in the roller chain casing 38, since the roller chain 16 is free at one end thereof. Therefore, a demand for a change in the moving distance of the roller chain 16 may be easily met when so required.

The requirement for causing reciprocating movement of the roller chain 16 along a curved path is also easily met by shaping the guide rail 18 to define such a curved path therein.

FIG. 2 is a sectional view taken along the line II—II in FIG. 1 to show the structure of the guide rail 18. Referring to FIG. 2, the guide rail 18 includes an upright stem 181 and a flange 182, and the guide portions 183 and 184 are formed on the opposite inner walls of the flange 182 to guide or support the roller portion 161 of the roller chain 16 from the opposite sides.

Beneath these guide portions 183 and 184, a pair of opposite guide grooves 185 and 186 are formed to guide the slide plate 40 of the trolley 20. These guide grooves 185 and 186 may be formed in the outer walls of the flange 182 of the guide rail 18.

The trolley 20 is releasably coupled to the roller chain 16 as described hereinbefore. This releasable coupling will be described with reference to FIG. 3A. Referring to FIG. 3A, the lug 42 formed on the intermediate coupling member 41 is adapted to engage with the square slot 38 formed in the connecting plate 36 mounted on the free end of the roller chain 16, and the body of the intermediate coupling member 41 is adapted to engage with the square slot 45 formed in the slide plate 40 of the trolley 20. A finger 43 extends from one of the side faces of the intermediate coupling member 41 through a slot 202 to be resiliently engaged by a spring pin 201 provided on the corresponding side face of the trolley 20 to hold the trolley 20 in the position coupled to the roller chain 16 by the resilient force of the pin 201.

The coupling between the roller chain 16 and the trolley 20 is released by pulling downward the lower end of a string 47 fixed at its upper end to the intermediate coupling member 41 thereby disengaging the finger 43 from the spring pin 201. Such an arrangement for releasing the coupling between the roller chain 16 and the trolley 20 is convenient when, for example, the door member 24 is manually operated without resorting to the motor 12.

Figure 3B:
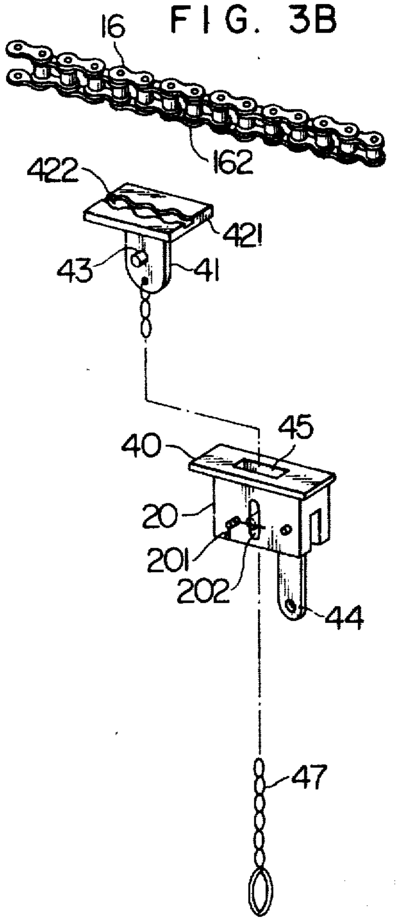
FIGS. 3B and 3C are exploded perspective views to show other forms of the coupling shown in FIG. 3A.
Figure 3C:
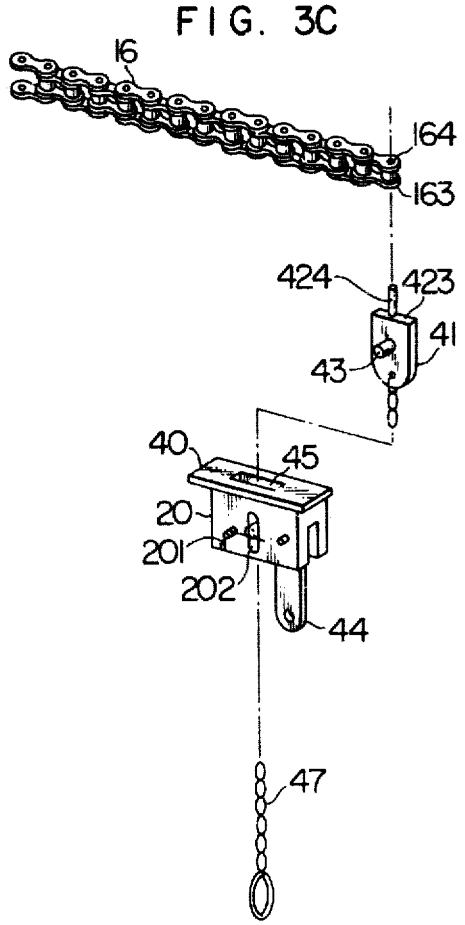

Other arrangements for achieving the releasable coupling between the roller chain 16 and the trolley 20 are shown in FIGS. 3B and 3C by way of example.

The arrangement shown in FIG. 3B differs from that shown in FIG. 3A in that, in lieu of forming the lug 42 on the intermediate coupling member 41, the intermediate coupling member 41 is provided with an engaging plate 421 having a surface groove 422 of the same shape as that of the lower plates 162 of the roller chain 16. In this case, therefore, the connecting plate 36 mounted on the free end of the roller chain 16 may be unnecessary.

The arrangement shown in FIG. 3C differs from that shown in FIG. 3A in that a coupling pin 424 extends from the upper face 423 of the intermediate coupling member 41 and is adapted to engage with a pin-receiving hole 164 formed in the roller link plate 163 at the free end of the roller chain 16.

As described hereinbefore, the roller chain 16 is free at one end thereof. The other end portion of the roller chain 16 is received or accommodated in the form of a spiral within the roller chain casing 38 as shown in FIG. 4A so that such end portion of the roller chain 16 may be easily guided into and out of the roller chain casing 38.

Figure 4B:
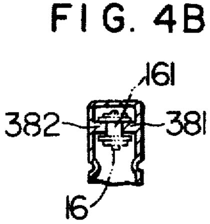
FIG. 4B is an enlarged sectional view of part of FIG. 4A.

FIG. 4B is an enlarged sectional view of part of the roller chain casing 38. It will be seen in FIG. 4B that the casing 38 includes guide portions 381 and 382 for guiding and holding the roller portion 161 of the roller chain 16 from the opposite sides. The effect of these guide portions 381 and 382 is therefore similar to that of the guide portions 183 and 184 of the guide rail 18.

FIG. 5A shows the mechanism for determining the predetermined upper and lower limit positions at which the door member 24 making traveling movement is stopped. Referring to FIG. 5A in which the upper limit position determining member 62 of the magnetic material is only shown, this member 62 is attached magnetically to a lower plate 162 of the roller chain 16 supported by the guide portions 183 and 184 of the guide rail 18 from the opposite sides. Preferably, a pair of recesses 621 and 622 are formed on the upper face of the upper limit position determining member 62, and this member 62 is attached to the lower plate 162 of the roller chain 16 in such a relation that roller pins (not shown) extending through the lower plate 162 of the roller chain 16 engage with these recesses 621 and 622 respectively. This arrangement is effective in increasing the force with which the upper limit position determining member 62 is attached to the associated face of the lower plate 162 of the roller chain 16.

This upper limit position determining member 62 may be mounted at any desired position on the roller chain 16 since it is attached thereto by the magnetic force. Therefore, the upper limit position determining member 62 is mounted on such a predetermined position of the roller chain 16 that the limit switch 52 is turned on by the magnetic force of this member 62 upon arrival of the door member 24 at its upper limit position, so that the stop position control for the door member 24 may be easily attained.

Figures 6A, 6B, 6C:
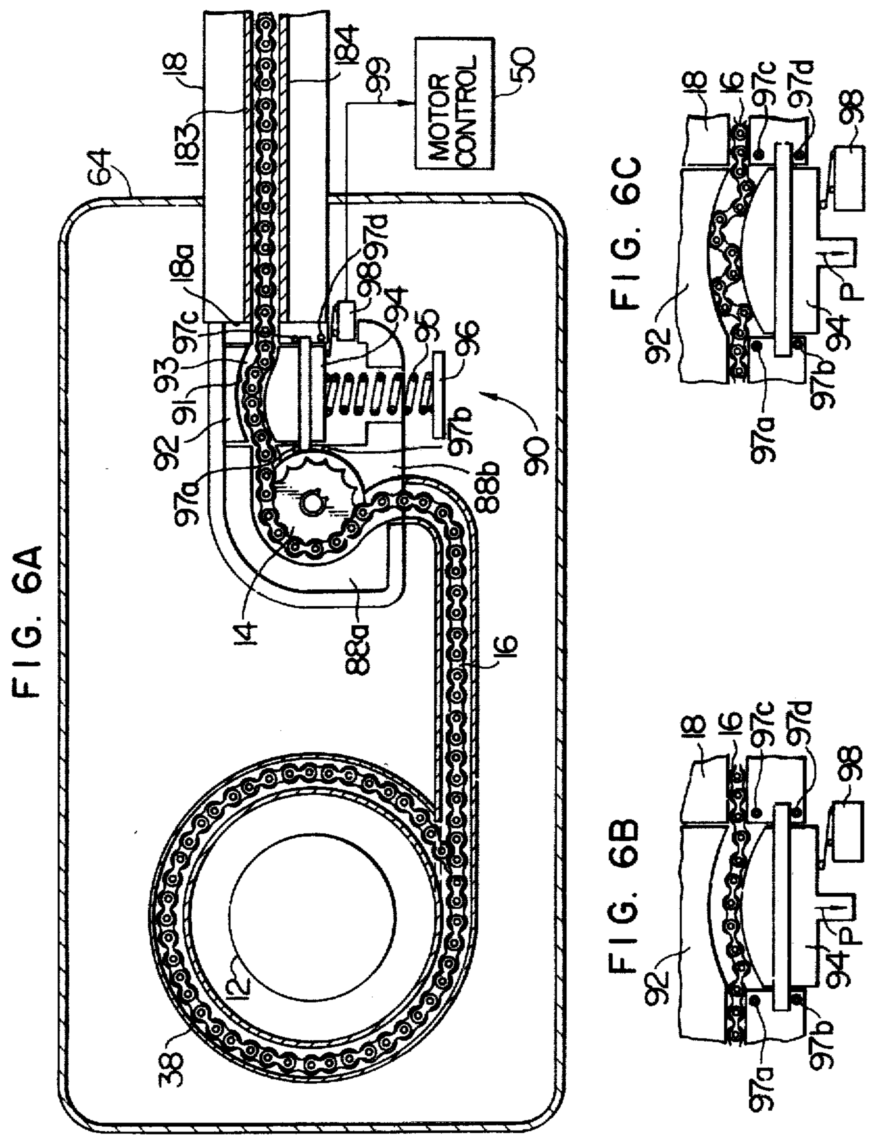
FIG. 6A is an enlarged, partial sectional view taken along the line VI—VI in FIG. 1 to show a mechanism for detecting the presence of an obstruction on the traveling path of the door member.
FIGS. 6B and 6C are schematic views to show how the presence of an obstruction is detected by the obstruction detecting mechanism shown in FIG. 6A.

The garage door opener 100 according to the present invention comprises an obstruction detecting mechanism 90 as shown in FIG. 6A for detecting the presence of an obstruction on the traveling path of the door member 24.

Referring to FIG. 6A, this obstruction detecting mechanism 90 is disposed in a zone between one end **18*a* of the guide rail 18 guiding the reciprocating movement of the roller chain 16 therealong and a stationary guide including guide members 88*a* and 88*b* which act to prevent disengagement of the roller chain 16 from the drive sprocket 14 and also to guide the movement of the roller chain 16 into and out of the roller chain casing 38**.

This obstruction detecting mechanism 90 comprises a roller chain supporting member 92 having a curved face 91 for guiding and supporting the roller chain 16 along this curved face 91, a roller chain forcing member 94 disposed opposite to the roller chain supporting member 92 to define therebetween a curved path 93 permitting free traveling movement of the roller chain 16 therethrough, a coil spring 95 for normally urging this roller chain forcing member 94 toward the roller chain supporting member 92, an adjusting member 96 for adjusting the biasing force of the coil spring 95, displacement limiting pins **97*a*, 97*b*, 97*c* and 97*d* for limiting the displacement of the roller chain forcing member 94, and a limit switch 98 turned on-off depending on the displacement of the roller chain forcing member 94 relative to the roller chain supporting member 92. When the limit switch 98 is turned on, its output signal is applied to the motor control 50 by way of a signal path 99**.

Suppose that an obstruction is present on the traveling path of the door member 24 when the door member 24 is traveling in its garage opening direction, that is, when the roller chain 16 is moving in the direction of the arrow 58 in FIG. 1. In such a case, the door member 24 is engaged by the obstruction and is prevented from traveling any further in the garage opening direction.

However, due to the fact that the motor 12, hence, the drive sprocket 14 still continues to rotate, the tensile force imparted in the moving direction (the axial direction) of the roller chain 16 increases as shown in FIG. 6B. Consequently, a force is imparted to the roller chain 16 moving freely through the curved path 93 to urge the roller chain 16 against the biasing force of the coil spring 95, and the roller chain forcing member 94 is urged in a direction as shown by the arrow P in FIG. 6B. Since the roller chain forcing member 94 is urged in the direction of the arrow P, the limit switch 98 is turned on, and its output signal is applied to the motor control 50 to stop the rotation of the motor 12.

Suppose then that an obstruction is present on the traveling path of the door member 24 when the door member 24 is traveling in its garage closing direction, that is, when the roller chain 16 is moving in the direction of the arrow 60 in FIG. 1. In this case too, the door member 24 is engaged by the obstruction and is prevented from traveling any further in the garage closing direction.

However, due to the fact that the motor 12, hence, the drive sprocket 14 still continues to rotate, it acts to continuously move the roller chain 16 in the direction of the arrow 60. Consequently, the torque transmitted to the roller chain 16 increases, and a compressive force is imparted to the roller chain 16 as shown in FIG. 6C. Although the portion of the roller chain 16 supported by the guide portions 183 and 184 of the guide rail 18 from the opposite sides is not flexed by this compressive force, the portion of the roller chain 16 moving freely through the curved path 93 is flexed in a manner as shown in FIG. 6C to impart a force to the confronting wall faces of the roller chain supporting member 92 and roller chain forcing member 94. Consequently, the roller chain forcing member 94 is urged in the direction of the arrow P in FIG. 6C thereby turning on the limit switch 98. The output signal of the limit switch 98 is applied to the motor control 50 to stop the rotation of the motor 12.

It will thus be seen that the tensile force or the compressive force acting upon the roller chain 16 in the event of the presence of an obstruction blocking the traveling movement of the door member 24 is utilized to detect the presence of the obstruction with a high reliability in spite of a simple structure.

The motor 12 will continue to rotate even when the traveling movement of the door member is blocked by an obstruction present on the traveling path of the door member 24. When the motor 12 is left in such a condition, an excessively large torque will be transmitted to the roller chain 16 and will result in damage to the roller chain 16 or in a burn-out trouble of the motor 12.

Figure 8:
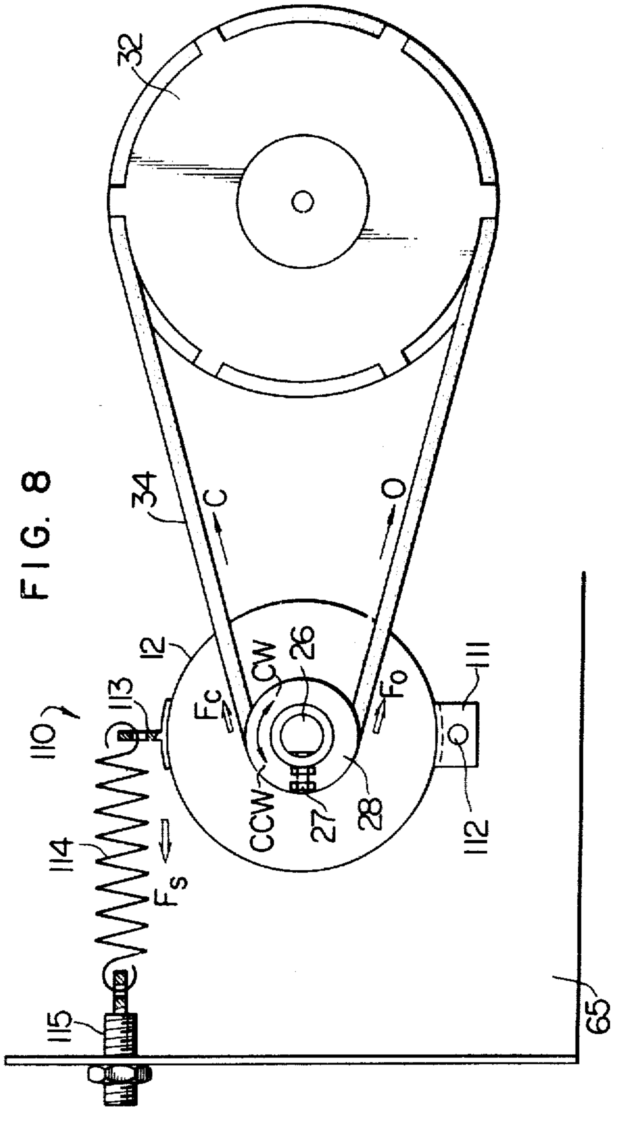
FIG. 8 is an enlarged schematic plan view showing a transmitted torque adjusting mechanism for protecting the drive mechanism shown in FIG. 1 against an excessively large torque transmitted thereto.

The garage door opener 100 according to the present invention comprises a transmitted torque adjusting mechanism 110 as shown in FIG. 8 so as to ensure the safety of the operation.

Referring to FIG. 8, the transmitted torque adjusting mechanism 110 comprises a first supporting member 111 mounted integrally to a portion of the motor 12 and having a hole extending therethrough, a supporting pin 112 fixed to a stationary base 65 of the housing 64 and engaging with the hole of the first supporting member 111 for pivotally supporting the motor 12 through the supporting member 111, a second or spring supporting member 113 mounted on the motor 12 at a position opposite to that of the first supporting member 111 relative to the output shaft 26 of the motor 12, and a spring 114 anchored at one end thereof to the spring supporting member 113 and at the other end thereof to an adjusting screw member 115.

The output shaft 26 of the motor 12 rotates clockwise as shown by the arrow CW in FIG. 8 when the door member 24 is traveling in the garage closing direction. Therefore, the small-diameter pulley 28 mounted on the output shaft 26 by a set screw 27 is driven in the same direction to drive the belt 34 in a direction as shown by the arrow C thereby transmitting the torque to the large-diameter pulley 32.

When the traveling movement of the door member 24 is stopped, that is, when the door member 24 is locked against traveling movement for some reason under the above condition, the motor 12 is driven to generate its maximum output, and consequently, a pivoting torque $F_C$ is imparted to the small-diameter pulley 28 is the direction of the arrow C tending to pivot the motor 12 in that direction around the supporting pin 112.

On the other hand, the motor 12 is supported by a predetermined tensile force Fs of the spring 114 through the spring supporting member 113. Thus, when the locked condition still continues, the load increases progressively to increase the output torque of the motor 12 until finally the relation $Fs < Fc$ holds, and the motor 12 is pivoted around the supporting pin 112 in such a direction as to reduce the tension of the belt 34 against the tensile force of the spring 114. Consequently, a slip occurs between the belt 34 and the small-diameter pulley 28 to cause racing of the pulley 28 relative to the belt 34 so that the torque greater than the predetermined amount is not transmitted to the large-diameter pulley 32.

During the garage opening movement of the door member 24, on the other hand, the output shaft 26 of the motor 12 rotates counter-clockwise as shown by the arrow CCW in FIG. 8 to drive the small-diameter 28 in the same direction thereby driving the belt 34 in a direction as shown by the arrow 0.

When the door member 24 traveling in the garage opening direction is locked against traveling movement for some reason, a pivoting torque Fo is imparted to the small-diameter pulley 28 in the direction of the arrow 0. The load increases progressively to increase the output torque of the motor 12 until finally the relation $Fs < Fo$ holds. Consequently, the motor 12 is pivoted around the supporting pin 112 in such a direction as to reduce the tension of the belt 34 against the tensile force Fs of the spring 114. The magnitude of the allowable transmitted torque may be selected as desired by adjusting the tensile force Fs of the spring 114 by the adjusting screw 115.

It will thus be seen that the transmitted torque adjusting mechanism in the device according to the present invention operates so that a torque greater than a predetermined setting is not transmitted to the drive sprocket 14 which drives the roller chain 16. Therefore, damage to the parts including the roller chain 16, guide rail 18 and trolley 20 due to impartation or transmission of an excessively large torque may be prevented prematurely.

Figure 9:
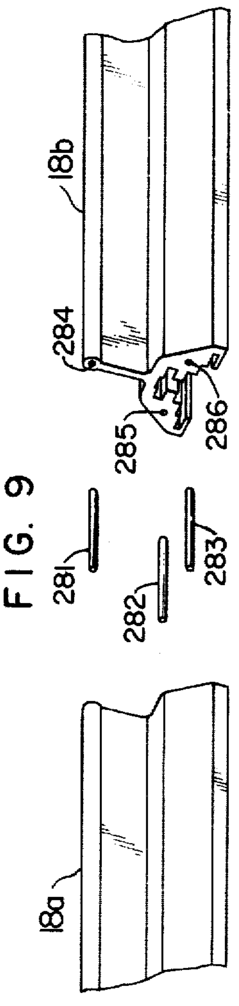
FIG. 9 is an enlarged schematic perspective view to show the manner of coupling between the adjacent sections of the guide rail divided into a plurality of sections.

FIG. 9 shows how adjacent ones of a plurality of guide rail sections constituting the guide rail 18 are coupled to each other. Referring to FIG. 9, pinreceiving holes 284, 285 and 286 are formed in each of guide rail sections **18*a* and 18*b*, and coupling pins 281, 282 and 283 are press-fitted in the associated pinreceiving holes 284, 285 and 286 of these guide rail sections 18*a* and 18*b* respectively, so that these two guide rail sections 18*a* and 18*b*** may be simply coupled together.

FIG. 7 shows the circuit structure of the motor control 50.

Referring to FIG. 7, an open instruction switch 501 and a close instruction switch 502 are provided for applying a garage opening signal and a garage closing signal respectively to the drive mechanism for the door member 24. These switches 501 and 502 are connected to flip-flop elements 505 and 506 through input circuits 503 and 504 respectively.

The flip-flop element 505 is connected to one terminal of a door-member open control relay 509 through a drive element 507 driving the relay 509, and the flip-flop element 506 is connected to one terminal of a door-member close control relay 510 through a drive element 508 driving the relay 510. Diodes 511 and 512 are connected in a forward direction in parallel with the door-member open control relay 509 and door-member close control relay 510 respectively.

Relay contacts 513 and 514 of the respective control relays 509 and 510 are connected in parallel with the motor 12. The power source 48 is connected at one terminal thereof to the connection point 515 of the relay contacts 513 and 514, and at the other terminal thereof to the motor 12. A capacitor 516 is connected between the relay contacts 513 and 514.

The limit switch 52 shown in FIG. 1 for determining the upper limit position of the door member 24 is connected to a NOR element 522 through an input circuit 521. The limit switch 54 shown in FIG. 1 for determining the lower limit position of the door member 24 is connected to a NOR element 542 through an input circuit 541.

The limit switch 98 in the obstruction detecting mechanism 90 shown in FIG. 6A is connected to an AND circuit 982 through an input circuit 981 and also to the NOR elements 522 and 542 via connection points 986 and 987.

The output terminal of the NOR element 522 is connected to the C terminal of the flip-flop element 505, and the output terminal of the NOR element 542 is connected to the C terminal of the flip-flop element 506. The output terminals of the flip-flop elements 505 and 506 are connected to the AND circuit 982 via respective connection points 520 and 521. The output terminal of the AND circuit 982 is connected to one terminal of a buzzer 984 through a transistor 983. A diode 985 is connected in parallel with the buzzer 984.

The input circuits 503, 504, 541, 521 and 981 are composed of resistors $R_1$, $R_2$; $R_3$, $R_4$; $R_5$, $R_6$; $R_7$, $R_8$; $R_9$, $R_{10}$; capacitors $C_1$; $C_2$; $C_3$; $C_4$; $C_5$; and inverters $IE_1$; $IE_2$; $IE_3$; $IE_4$; $IE_5$; respectively. The drive elements 507 and 508 are composed of AND gates $G_1$, $G_2$ and transistors $T_1$, $T_2$ respectively.

The AND circuit 982 is composed of an inverter element $IE_6$ connected to the flip-flop element 505 via the connection point 520, another inverter element $IE_7$ connected to the flip-flop element 506 via the connection point 521, a NAND element VA connected to the respective output terminals of the inverter elements $IE_6$ and $IE_7$ and to the output terminal of the input circuit 981, and another inverter element $IE_8$ connected to the output terminal of the NAND element NA.

When the open instruction switch 501 is turned on in the circuit shown in FIG. 7, the open instruction signal is applied to the input circuit 503, and the output signal of the input circuit 503 is applied to the flip-flop element 505. The flip-flop element 505 is triggered, and its output signal actuates the drive element 507. The door-member open control relay 509 is thereby energized, and its relay contact 513 is closed to drive the motor 12.

The motor 12 transmits its output torque to the roller chain 16 through the small-diameter pulley 28, belt 34, large-diameter pulley 32 and drive sprocket 14 shown in FIG. 1 to drive the roller chain 16 in the direction of the arrow 58 thereby moving the door member 24 in the direction of the arrow 74 through the trolley 20 and arm 22.

The upper limit position determining limit switch 52 is turned on upon arrival of the door member 24 at the predetermined upper limit position. The output signal of this limit switch 52 is applied to the NOR element 522 through the input circuit 521. The output signal of the NOR element 522 is applied to the C terminal of the flip-flop element 505 to clear this flip-flop element 505. Consequently, the output signal from the flip-flop element 505 disappears to open the relay contact 513 of the open control relay 509 thereby stopping the rotation of the motor 12. The door member 24 is therefore stopped at the predetermined upper limit position.

The garage closing operation of the door member 24 is similar in principle to the garage opening operation above described. In this case, the close instruction switch 502 is turned on to energize the close control relay 510 via the input circuit 504, flip-flop element 506 and drive element 508 thereby driving the motor 12 in the reverse direction.

The lower limit position determining limit switch 54 is turned on upon arrival of the door member 24 at the predetermined lower limit position. The output signal of this limit switch 54 is applied through the input circuit 541 to the NOR element 542, and the output signal of the NOR element 542 clears the flip-flop element 506 thereby stopping the rotation of the motor 12. The door member 24 is therefore stopped at the predetermined lower limit position.

When an obstruction is present on the traveling path of the door member 24 during the upward traveling movement in the garage opening direction or downward traveling movement in the garage closing direction, the limit switch 98 in the obstruction detecting mechanism 90 is turned on as described with reference to FIG. 6A. The output signal of this limit switch 98 is applied via the connection point 986 to the NOR elements 522 and 542. Consequently, the flip-flop element 505 or 506 is cleared in the same manner as that above described thereby stopping the rotation of the motor 12.

When an external force for forcedly breaking open the door member 24 is imparted in the state in which the door member 24 is in its garage closing position and the motor 12 is not under rotation, this force is transmitted to the roller chain 16 via the door member 24 and trolley 20, and the roller chain forcing member 94 in the obstruction detecting mechanism 90 is urged downward as shown in FIG. 6C by the flexed roller chain 16. Consequently, the limit switch 98 is turned on, and an input signal is applied to the NAND element NA in the AND circuit 982.

Since the motor 12 is not under rotation, the output signals from the flip-flop circuits 505 and 506 are in their "O" level. These output signals are inverted by the respective inverter elements $IE_6$ and $IE_7$ in the AND circuit 982 to be applied to the NAND element NA. Consequently, an output signal representing the logical product of these three input signals appears from the AND circuit 982 to turn on the transistor 983 thereby energizing the buzzer 984. Thus, invasion of an invader who tries to forcedly break open the door member 24 from the outside may be reliably prevented.

While the present invention has been specifically described with reference to its application to a garage door opener, it is apparent that the present invention is in no way limited to such a specific application, and it is equally effectively applicable to any other devices, for example, a device for driving a curtain.

Figures 10A, 10B, 10C:
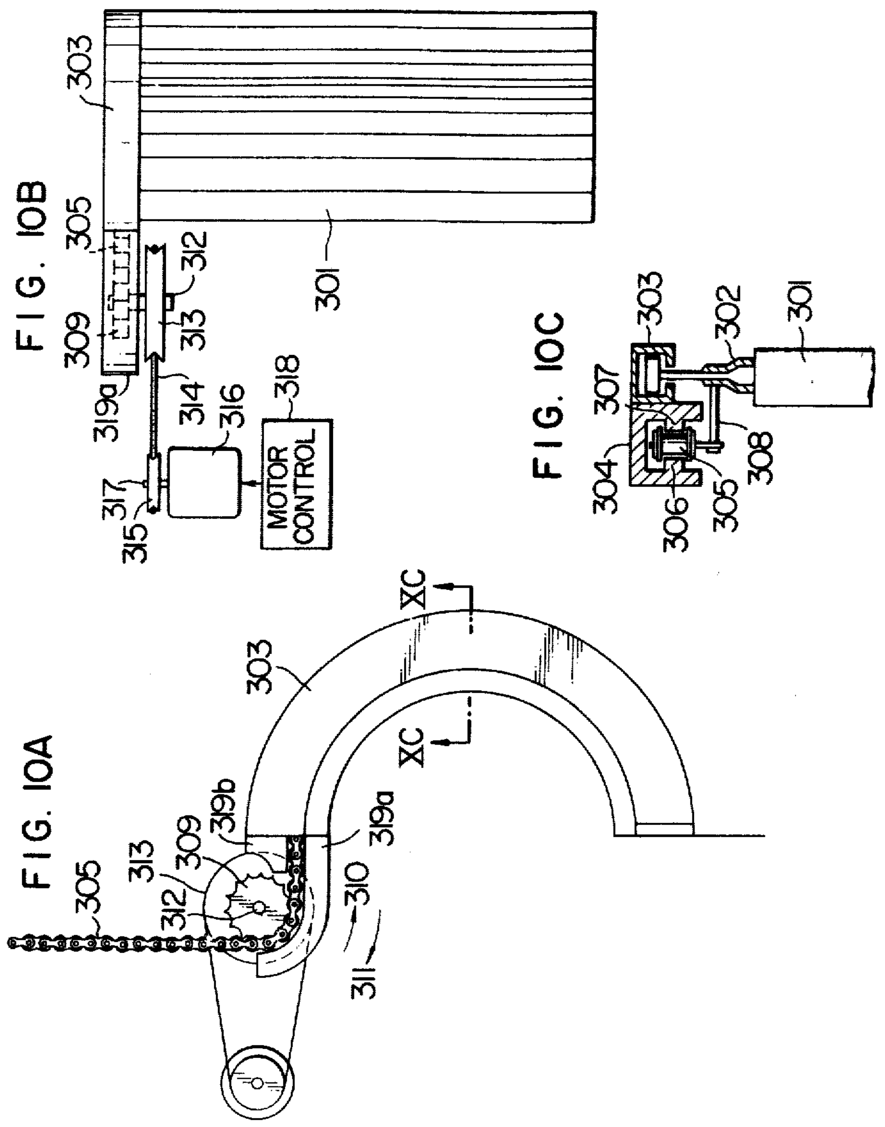
FIG. 10A is a schematic plan view of another embodiment of the present invention to show an application of the present invention to a curtain opener.
FIG. 10B is an elevational view of FIG. 10A.
FIG. 10C is a sectional view taken along the line XC—XC in FIG. 10A.

FIGS. 10A, 10B and 10C show schematically an application of the present invention to a curtain driver or opener.

Referring to FIGS. 10A, 10B and 10C, a curtain 301 is supported by supporting members 302 engaging with a curtain rail 303 defining a curved path so as to make reciprocating movement along the curtain rail 303. A guide rail 304 of curved shape extends in parallel to the curved path defined by the curtain rail 303. This guide rail 304 includes guide portions 306 and 307 for guiding a roller chain 305 having a free end and also for supporting the roller chain 305 from the opposite sides. The roller chain 305 is connected by connecting members 308 to the supporting members 302 supporting the curtain 301.

The roller chain 305 is driven in a direction as shown by the arrow 310 or in the opposite direction as shown by the arrow 311 by a drive sprocket 309. This drive sprocket 309 is mounted on the shaft 312 of a large-diameter pulley 313. This pulley 313 is driven through a belt 314 and a small-diameter pulley 315 by a motor 316 whose output shaft 317 mounts the pulley 315 thereon. The motor 316 is controlled by a motor control 318. The roller chain 305 is guided and supported by stationary guides **319*a* and 319*b*, in the zone adjacent to the drive sprocket 309**.

The curtain 301 is opened or closed in response to the application of an open instruction signal or a close instruction signal to the motor control 318. Thus, when the motor 316 is driven, the roller chain 305 makes reciprocating movement along the guide rail 304 which is shaped to conform to the shape of the curtain rail 303 defining the curved path along which the curtain 301 is guided.

It will thus be seen that a roller chain having a free end is connected at its free end portion to a driven member such as a curtain to simply open and close the curtain.

What we claim is:

1. A device for driving a driven member by a roller chain comprising:

a roller chain having a free end and a plurality of interlinked roller portions;

a driven member automatically releasably coupled to said roller chain;

guide means for guiding and supporting said roller chain along a driven path together with said driven member, including a guide rail having a first passage therein defined by first guide portions for supporting the roller portion of said roller chain from opposite sides so that the axes of said roller portions extend vertically thereby guiding the roller chain along said linear path and a second passage therein defined by second guide portions for guiding said driven member;

drive means for driving said roller chain so as to cause reciprocating movement of said roller chain along said guide means; and control means for controlling the operation of said drive means to control movement of said driven member.

2. A device as claimed in claim 1, wherein said guide rail provides a first guide path along which said roller chain is guided for reciprocating movement while making rolling engagement at its roller portion with said first guide portions and a second guide path along which said driven member is guided and supported by said second guide portions for the same reciprocating movement as said roller chain.

3. A device as claimed in claim 1 or 2, wherein said guide means comprises means for accommodating the other end portion of said roller chain therein, so that, on one hand, said roller chain may be guided along said guide means while being supported from the opposite sides and making rolling engagement at its roller portion therewith, and, on the other hand, the other end portion of said roller chain may be guided into said accommodation means to be stored in a spiral form therein without an external force.

4. A device as claimed in claim 1 or 2, wherein said driven member comprises a trolley releasably coupled to said roller chain, and an arm to pivotally connect a closure member to said trolley.

5. A device as claimed in claim 4, wherein said trolley is guided along guide grooves formed below first guide portions of said guide means for supporting and guiding said trolley.

6. A device as claimed in claim 4, wherein said trolley is releasably coupled to said roller chain at the free end of said roller chain.

7. A device as claimed in claim 6, wherein said trolley is releasably coupled to the free end of said roller chain by a coupling member.

8. A device as claimed in claim 1 or 2 wherein said drive means comprises a single drive sprocket making driving engagement with said roller chain to cause reciprocating movement of said roller chain along said guide means, and a motor driving said single drive sprocket.

9. A device as claimed in claim 1 or 2 wherein said control means comprises means for stopping said driven member at a predetermined position.

10. A device as claimed in claim 1 or 2 wherein said control means comprises means for generating an alarm signal in response to the impartation of an external force to said driven member when such an external force is imparted to said driven member in an inoperative condition of said drive means.

11. A device as claimed in claim 1 or 2 further comprising obstruction detecting means for detecting the presence of an obstruction obstructing the smooth traveling movement of said driven member, said detecting means detecting the presence of such an obstruction in response to a physical force acting upon said roller chain while said driven member is engaged by said obstruction.

12. A device as claimed in claim 11 wherein said physical force to which said detector responds is a tensile force imparted to said roller chain when said driven member is traveling in the first direction and a compressive force imparted to said roller chain when said driven member is traveling in the second direction opposite to said first direction.

13. A device as claimed in claim 11, wherein said drive means comprises transmitted torque adjusting means for adjusting the torque transmitted to said roller chain so that the torque may not exceed a predetermined setting while said driven member is engaged by said obstruction.

14. A device as claimed in claim 13, wherein said transmitted torque adjusting means comprises means for causing racing of said drive means when the torque transmitted to said roller chain from said drive means exceeds the predetermined setting.

15. A device as claimed in claim 14, wherein said transmitted torque adjusting means comprises a mounting base mounting said drive means thereon, a first supporting member connected to a portion of said drive means for pivotally supporting said drive means on said mounting base, and a second supporting member connected to another portion of said drive means for movably supporting said drive means of said mounting base through a resilient member imparting a predetermined tensile force thereto.

16. A device for driving a driven member by a roller chain comprising:

a roller chain having a free end;

a driven member automatically releasably coupled to said roller chain;

guide means for guiding and supporting said roller chain together with said driven member;

drive means for driving said roller chain so as to cause reciprocating movement of said roller chain along said guide means; and control means for controlling the operation of said driven member, including means for generating an alarm signal in response to the impartation of an external force to said driven member when such an external force is imparted to said driven member in an inoperative condition of said drive means;

wherein said alarm signal generating means comprises an AND circuit receiving, as its input signals, an output signal indicative of the inoperative condition of said drive means and an output signal generated in response to the impartation of the external to said driven member, and an alarm generator generating the alarm signal in response to the appearance of the output signal from said AND circuit.

17. A device for driving a driven member by a roller chain comprising:

a roller chain having a free end;

a driven member automatically releasably coupled to said roller chain;

guide means for guiding and supporting said roller chain together with said driven member;

drive means for driving said roller chain so as to cause reciprocating movement of said roller chain along said guide means;

control means for controlling the operation of said driven member; and obstruction detecting means for detecting the presence of an obstruction obstructing the smooth travelling movement of said driven member, said detecting means detecting the presence of such an obstruction in response to a physical force acting upon said roller chain while movement of said driven member is prevented by said obstruction, including a stationary member having a curved face, a movable member disposed opposite to said stationary member and having a curved face defining, together with the curved face of said stationary member, a curved path permitting passage of said roller chain therethrough, and a detector actuated in response to the impartation of a physical force to said movable member from the portion of said roller chain passing through said curved path.

18. A device for driving a driven member by a roller chain comprising:

a motor;

a small-diameter pulley mounted on the output shaft of said motor;

a large-diameter pulley receiving the drive force from said small-diameter pulley through a belt;

a single drive sprocket mounted on the shaft of said large-diameter pulley;

a roller chain having a free end and driven by said single drive sprocket for reciprocating movmement;

a trolley releasably coupled to the free end of said roller chain by a connecting plate and an intermediate coupling member;

a guide rail for guiding and supporting said roller chain and said trolley, said guide rail including guide portions for supporting the roller portion of said roller chain from the opposite sides and guiding the rolling movement of said roller portion therealong, and guide grooves for guiding sliding movement of said trolley therealong;

an arm pivotally connected to said trolley for connection to a closure member;

a first control circuit applying an open instruction signal to said closure member for rotating said motor in a first direction and applying a stop signal to said motor upon arrival of said closure member at a predetermined upper limit of its traveling movement;

a second control circuit applying a close instruction signal to said closure member for rotating said motor in a second direction and applying a stop signal to said motor upon arrival of said closure member at a predetermined lower limit of its traveling movement;

a stationary member having a curved face, a movable member disposed opposite to said stationary member and resiliently urged by a coil spring toward said stationary member, said movable member having a curved face so as to define between its curved face and the curve face of said stationary member a curved path permitting passage of said roller chain therethrough, and a limit switch actuated in response to the impartation of a physical force to said movable member from the portion of said roller chain passing through said curved path;

a third control circuit stopping the rotation of said motor in response to the application of the signal from said limit switch; and a fourth control circuit receiving the output signals from said first, second and third control circuits as its input signals and providing an output signal representing the logical product of these three input signals.

* * * * *